Sept. 5, 1967 W. G. CAMPBELL ETAL 3,339,407
OCEANOGRAPHY PROBE
Filed April 22, 1965 4 Sheets-Sheet 1
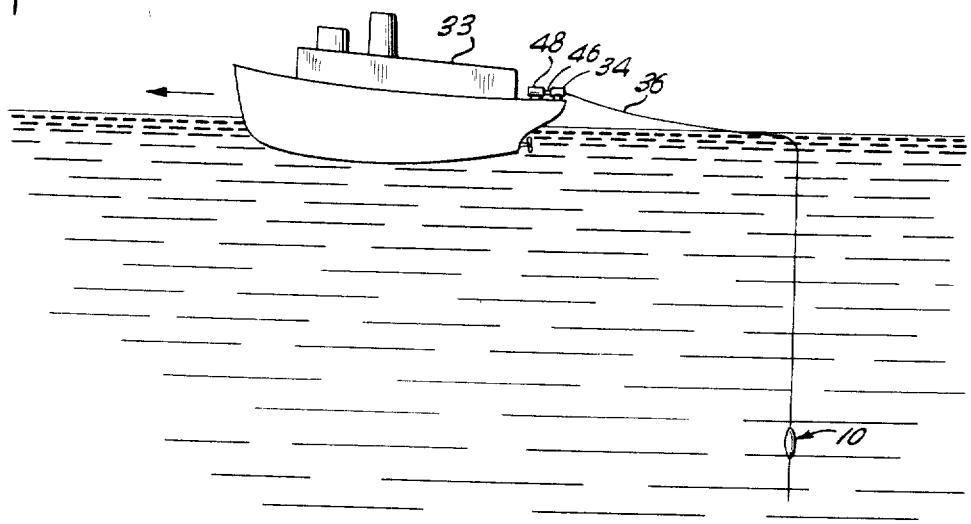
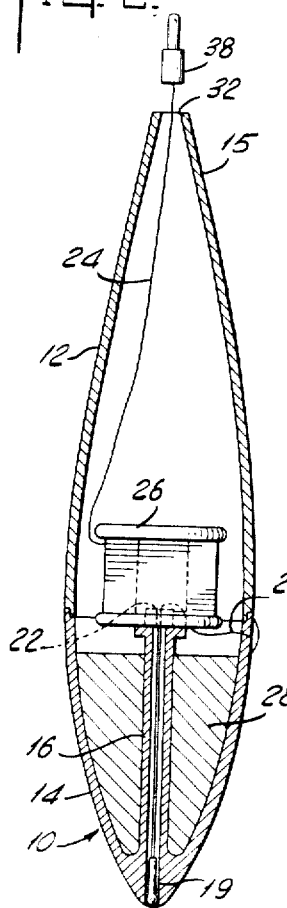
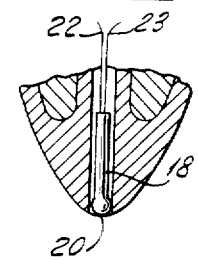
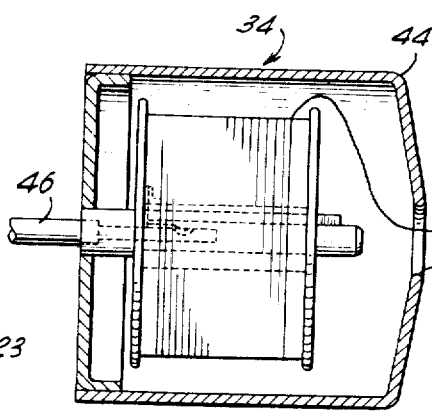
INVENTORS
WALTER G. CAMPBELL
WILLIAM VAN ALLEN CLARK, JR
COURTLAND B. CONVERSE
BY Nolte & Nolte
ATTORNEYS

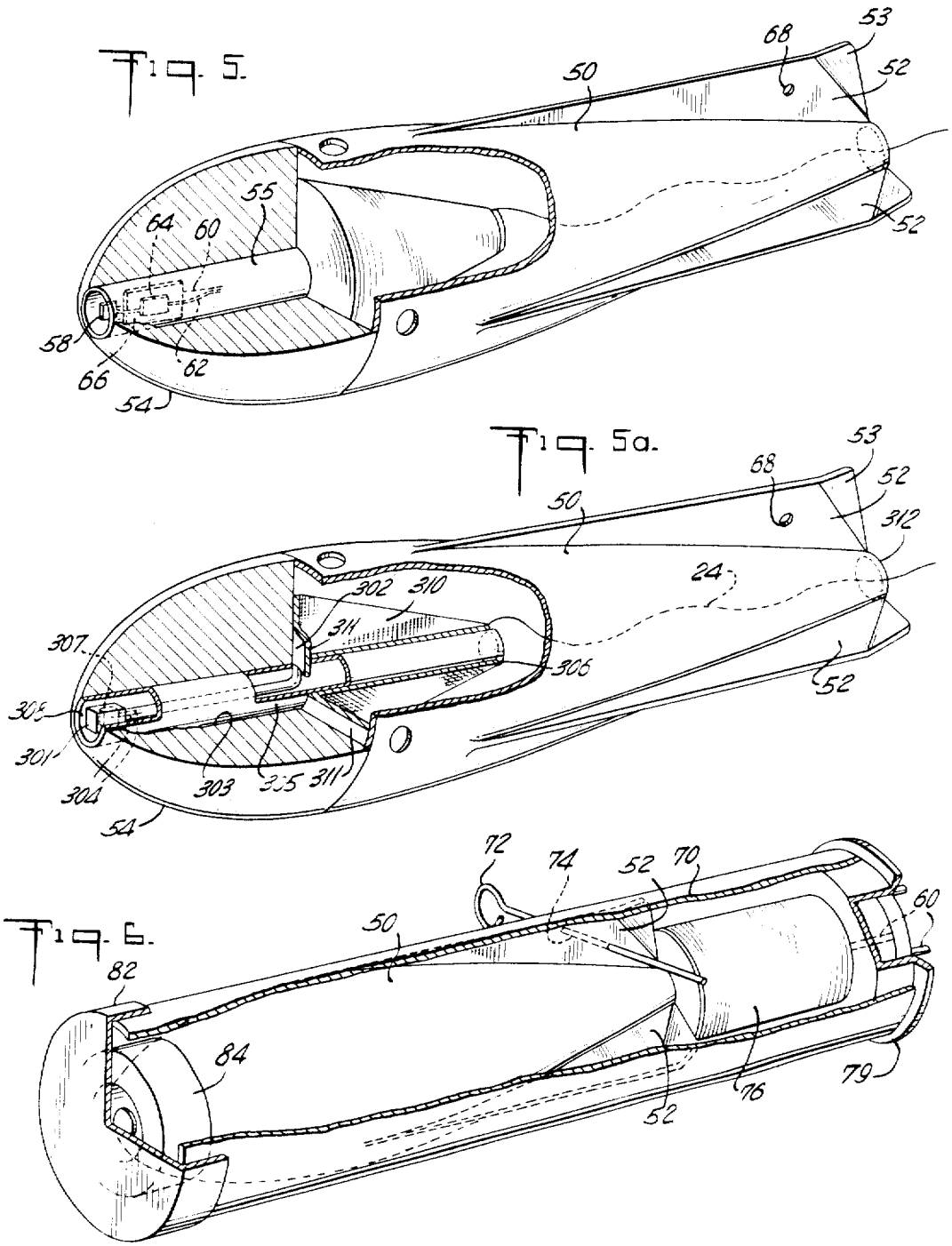

Sept. 5, 1967     W. G. CAMPBELL ETAL     3,339,407
OCEANOGRAPHY PROBE
Filed April 22, 1965     4 Sheets-Sheet 3
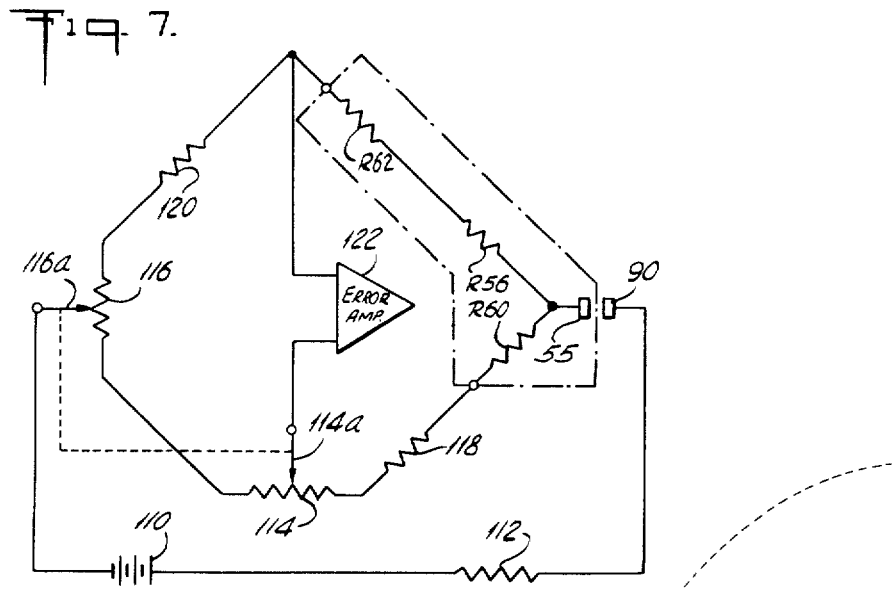
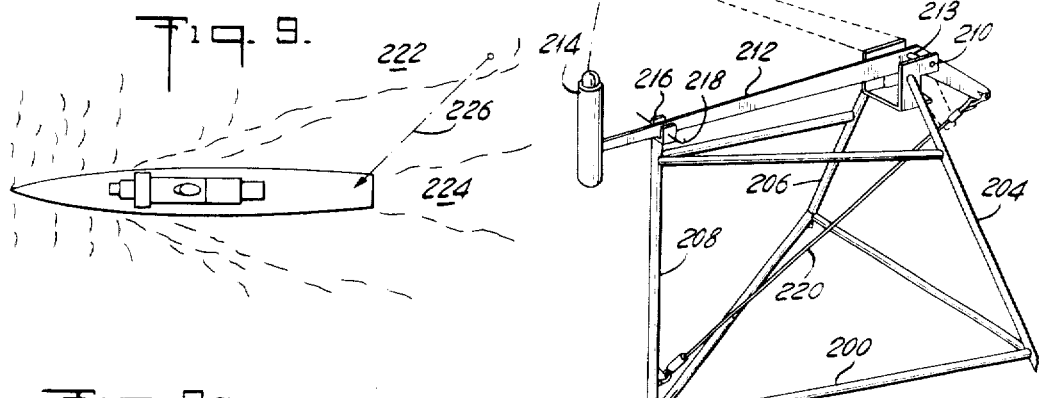
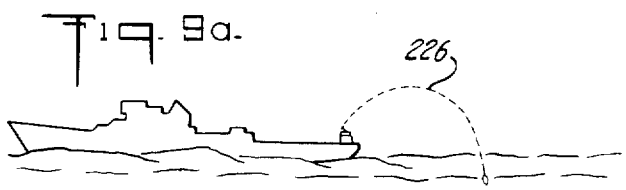
INVENTORS
WALTER G. CAMPBELL
WILLIAM VAN ALLEN CLARK, JR.
COURTLAND B. CONVERSE
BY Nolte & Nolte
ATTORNEYS

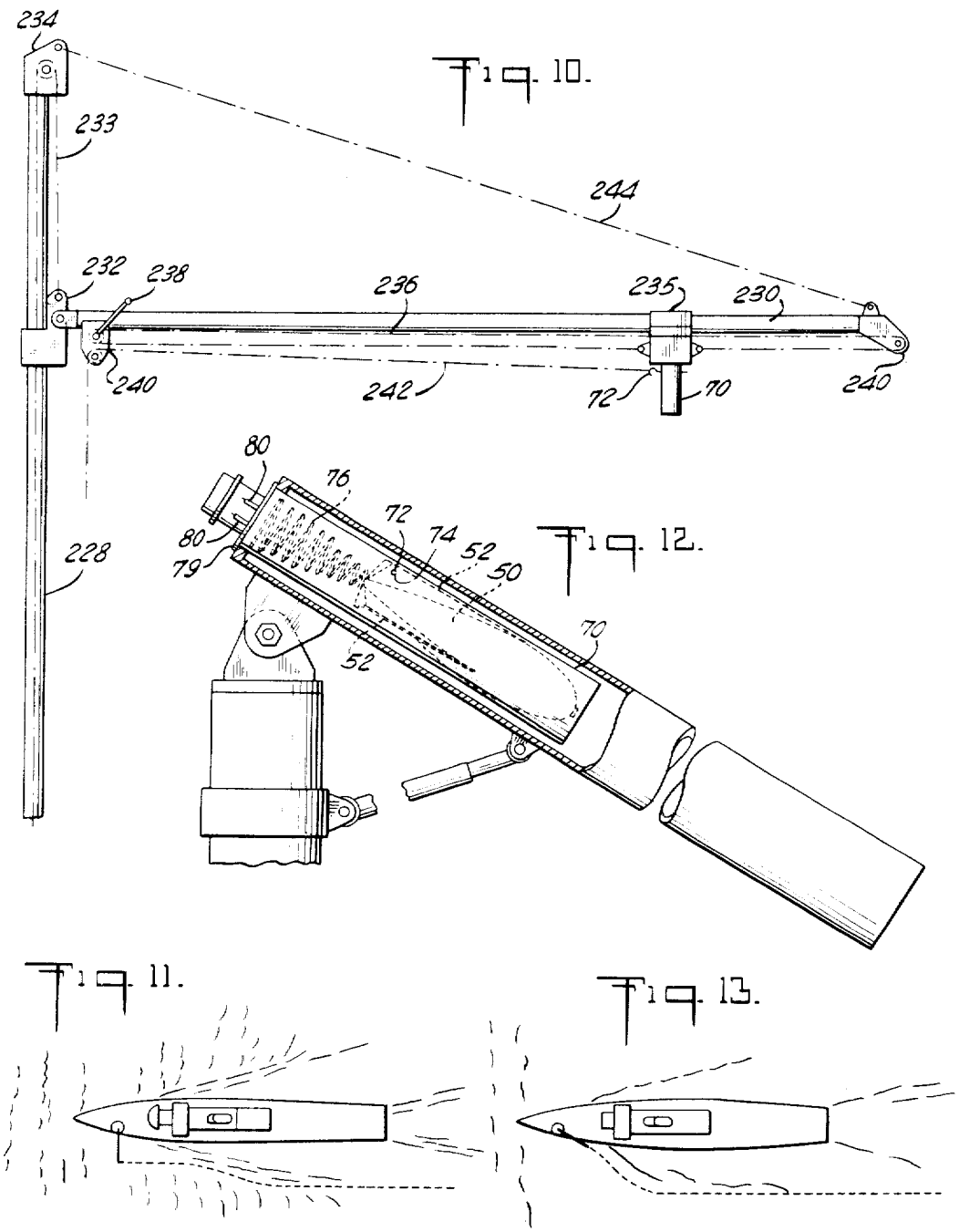

3,339,407
OCEANOGRAPHY PROBE
Walter G. Campbell, W. Van Alan Clark, Jr., and Courtland B. Converse, Marion, Mass., assignors to Buzzards Corporation, Marion, Mass., a corporation of Massachusetts
Filed Apr. 22, 1965, Ser. No. 450,151
5 Claims. (Cl. 73—170)

ABSTRACT OF THE DISCLOSURE

The present invention includes a canister, for use in a bathythermograph system in which a property of a fluid is measured at varying depths and such information is transmitted to a remote location, said canister including an elongated hollow container portion having a forward open end and a rearward end, the container portion being cylindrical, a stationary conductor coil in wound configuration within the container portion and comprising a continuous wire coiled for being freely payed out from the coil, electrical contact means comprising pin connectors secured to the rearward end of the container portion, said contact means adapted to electrically engage vehicle mounted electrical apparatus, means for releasing a probe from within the container portion, and a protective cap for covering the open end.

---

This application is a continuation-in-part of application Ser. No. 342,338, filed Jan. 31, 1964 and now U.S. Patent No. 3,221,556, which issued Dec. 7, 1965, to Campbell et al.

This invention relates to apparatus for measuring various properties of the ocean or a body of water with respect to depth.

In large bodies of water, properties such as temperature, salinity, etc., change considerably with respect to depth. There are many reasons why it is desirable to detect and record these properties at different points in the ocean. For example, the variation of temperature or the existence of low depth liquid layers at a specific temperature can seriously affect the properties of acoustical energy as it is propagated through the water. Such changes deleteriously affect the performance of sonar devices such as weapons systems and commercial devices used, for example, for fish detecting purposes.

Various devices and methods have been proposed for the collection of the data necessary to accurately determine ocean properties such as temperature and salinity over a wide range of depths. Heretofore, the proposed systems have lacked accuracy and reduction of the collected data and has been time consuming and non-automatic. In addition, the present systems have been useful over only limited depth ranges, while requiring a reduction in the speed of the launching ship during the measuring periods.

Accordingly, the main object of the present invention is to provide an aquatic measuring device which avoids all of the above-mentioned drawbacks.

A more specific object is to provide a deeper, more accurate aquatic measuring device for use with ships underway at higher speed and higher sea states, while maintaining flexibility of ship maneuvers.

Another object of the invention is to provide an improved aquatic probe for testing various properties of water as a function of depth.

It is also an object of the invention to provide an improved aquatic measuring system wherein free falling vertical descent of a probe is insured regardless of the lateral movement of the transporting vehicle.

Still another object is to provide an aquatic measuring system capable of rapidly and accurately manifesting the value of a specific property of the ocean as a function of depth.

Yet another object is to provide an aquatic measuring system including means for compensating for errors in depth measurement introduced by temperature variations at different depths.

Yet another object is to provide a bathythermograph in which all of the components are relatively portable and may be easily installed on board ship.

It is also an object of the invention to provide an aquatic measuring system which is simple and reliable.

According to the invention, the above objects are accomplished by use of an aquatic probe which contains a particular sensing device and which may be deployed from a ship or the like. The probe returns electrical signals, indicative of the particular property being measured, to the ship via wire which uncoils from both the probe and the ship to minimize the effect of wire deployment on the vertical descent of the probe.

In a preferred embodiment of the invention, the shipboard apparatus includes means for measuring the signals returned by the probe as a function of depth by correlating the depth of the probe to the probe's constant rate of descent. For the sake of accuracy, a signal may be given the instant the probe hits the water to begin measurement at a fixed rate accurately related to the probe's rate of descent. The property sensing means of the probe may be connected in a bridge arrangement, with an additional wire added to the probe and coupled to the sensing means and bridge in such a manner as to cancel out the effects of the resistance changes in the signal transmitting wire due to temperature variations as the depth increases.

The manner in which the above and other objects of the invention are accomplished will be described in further detail below with reference to the following drawings, wherein similar reference characters denote similar elements through the several views:

FIG. 1 is a drawing of an expandable ballistic bathythermometer according to the invention;

FIG. 2 is a cross sectional view of the bathythermometer of FIG. 1;

FIG. 3 is an exploded view of a portion of the bathythermometer of FIG. 2;

FIG. 4 is an exposed view of the cable spool mounted on the ship of FIG. 1;

FIG. 5 and 5a are perspective views of aquatic probes according to other embodiments of the invention;

FIG. 6 is a perspective view of the aquatic probe of FIG. 5 mounted in its shipping canister;

FIG. 7 is a schematic illustration of the measuring bridge of the invention;

FIG. 8 is a perspective view of the catapult apparatus for launching the aquatic probe of the invention;

FIGS. 9 and 9a are diagrammatic illustrations of the manner in which the catapult of FIG. 8 launches the probe into the water;

FIG. 10 is a side view of boom launching system for the probe;

FIG. 11 is a diagrammatic illustration of the manner in which the boom launches the probe into the water;

FIG. 12 is a side view partly in section of a tube launching apparatus for the probe; and, FIG. 13 is a diagrammatic illustration of the manner in which the tube launcher of FIG. 12 launches the probe into the water.

The present invention will be described relative to a bathythermograph or temperature sensing device, but it is to be understood that the principles of the present invention are equally applicable to devices which measure any property of a body of water as a function of depth.

As shown in FIG. 1, the invention includes an expandable probe 10 which is deployed from a moving ship containing the measuring apparatus to which probe 10 is electrically coupled via wire 36. As will become more apparent hereinbelow, a fundamental feature of the invention is the fact that the wire is deployed in both horizontal and vertical directions to thus minimize the effect of wire deployment on the probe's descent.

As can be seen more clearly from FIG. 2, the bathythermometer 10 includes a housing 12, and a nose portion 14 which combine into a teardrop shape having a smooth, rounded, forward end extending rearwardly to a relatively small pointed rear portion 15. Mounted within the housing, and centrally positioned therein is a tube 16 integrally formed with the housing. A thermistor element 18 is positioned in the forward portion 14 of the housing within the cavity 19 formed by tube 16, to allow exposure of the thermistor to the ambient liquid. Electrically connected to thermistor 18 are wire leads 22 and 23. Leads 22 and 23 extend through tube 16, to cable 24 which is coiled upon cable spool assembly 26. Assembly 26 is mounted upon tube 16 by suitable means (not shown). Mounted concentrically about tube 16 in a symmetrical manner is a weight 28 which may consist of any suitable material such as lead to provide the bathythermometer with sufficient weight to move the unit down through the liquid at the desired rate of descent.

In the single wire system illustrated in FIG. 2, wire 23 leading from thermistor 18 is electrically connected to the conductive housing 12, while lead 22 is connected to the innermost end of the conductor 24 coiled about the spool 26. Thus, the ocean in this embodiment is utilized as the return signal path for the system. In the rear portion 15 of housing 12 there is located an opening 32 which serves to allow the exit of conductor 24 therethrough. Moreover, because the wire is deployed in both directions, it is possible to utilize a conductor having a smaller cross-sectional area than normal due to the reduced stresses experienced by the wire. Conductors having wire gage of #40 or smaller may be utilized without breakage.

As will be explained below, in preferred embodiments, the invention utilizes one, two or three or more wire measuring systems in which the seat itself serves as a return path. However, the probe can be utilized with any number of wires and could readily be used, for example, in a three wire system with no sea return path.

Conductor 24 is payed out through the rear of housing 12 to the spool on the signal-receiving vehicle 33, as shown in FIG. 1. Conductor 24 is connected to conductor 36 which is mounted upon spool assembly 34 as shown more clearly in FIG. 4. A male connector 38 is secured to the end of conductor 24 and female connector 40 is secured to the end of conductor 36, thereby providing for the connection of the conductors. Lead 22, extending through conductor 24 is electrically connected to male connector 38. Thus the electrical connection with the thermistor extends to conductor 36 through insulating conductor 24. Conductor 36 is payed out through opening 42 in housing 44 of spool assembly 34. The inner end of cable 36 is connected through conduit 46 to suitable electronic measuring equipment 48 which interprets the signals received from the sensing elements.

The embodiment described hereinabove relates to a temperature measuring device; however, it should be understood that a system as described may be utilized to measure the pressure, salinity, speed of sound, light conductivity, density, etc. of the ambient liquid. Thus, the aquatic device described herein may be employed in a variety of liquid property measuring capacities.

In the present invention a system is described which provides for the continuous measurement of the temperature for the ambient liquid relative to its depth. The operation of the system can best be understood with reference to FIG. 1.

The cable spool assembly 34, positioned aboard the signal-receiving ship 33 allows cable 36 to be freely payed out to thereby provide for the horizontal motion of the ship. Cable 24 stored within housing 12 upon spool assembly 26 is freely payed out through opening 32 to thereby provide for the vertical motion of the bathythermometer. It can be readily understood that by positioning a cable spool within the housing of the bathythermometer and another spool assembly aboard a moving ship a means is provided which allows the bathythermometer to fall freely since the cable holding the bathythermometer does not move in relation to the water in either a horizontal or vertical direction. This phenomenon is effected because the unwinding of the cable from spool 34, located aboard the ship compensates for any horizontal motion of the cable with respect to the water and the cable being payed out of the bathythermometer eliminates any vertical motion of the cable with respect to the water. Thus the cable represented by the line in FIG. 1 does not move with respect to the water in either a vertical or a horizontal direction.

In the present invention the system parameters involved are the continuous measurement of temperature with depth. Thus as the bathythermometer falls through the liquid the temperature of the liquid changes with the change in depth. These changes in temperature are sensed by the change in the resistance of the thermistor contained in the temperature probe exposed to the ambient liquid. The signals representing the resistance values sensed by the thermistor are transmitted through cables 24 and 36 of the conduit 46 to the shipboard receiving equipment 48. It is essential, therefore, in the context of the present invention that the depth of the liquid through which the temperature probe is passing at any particular instant be accurately known. The rate of descent of the missile may be determined empirically to thereby allow the depth of the bathythermometer at any particular instant to be calibrated through the utilization of a time-scaled recording. Thus, the temperature of the liquid at a particular depth may be accurately determined.

From the foregoing it may be understood that any horizontal or vertical movement of the cable relative to the water would seriously impair the accurate determination of the depth of the temperature probe because the velocity of the missile would vary due to the unpredictable frictional resistance of the cable caused by any movement of the cable relative to the water. Since, as explained above the present invention provides a relatively stationary cable which does not add any significant friction to the system, this problem has been obviated. Thus, reducing the friction of the system to a minimum and providing a truly free-falling temperature probe is a primary concern of the invention. The application of this concept results in a freely falling body whose velocity is not affected by the cable attached to it since the cable is not dragged through the water but as a result of being payed out by the missile and by the receiving vehicle remains stationary with respect to the water.

In the event that the present invention is to be utilized by deploying it from a stationary carrier such as a dock or a stationary ship the second play out spool 34 will not be necessary. Thus the end of the cable 24 may be attached directly to the receiving equipment and the temperature probe dropped straight down into the water. The play-out spool 26 located within the housing 12 of the bathythermometer will again provide for a freely falling object. Cable 24, therefore, will not offer any resistance to the water because it will remain stationary relative to the water, thereby providing for a more linear and predictable rate of fall for the temperature probe.

It should be noted that by designing the temperature probe for positive rather than negative buoyancy the system may be adapted to work in reverse. Thus the temperature probe could be released from a submerged location, for example from a submarine, and the temperature probe will rise vertically up through the water with the conductor 24 being payed out through the rear of the probe.

The actual apparatus designed to measure the temperature sensed by the probe employing a single wire conductor and the sea return path is described in copending application Ser. No. 451,735, filed Apr. 29, 1965 and now abandoned, by Samuel Francis.

A significant feature of the invention resides in the system which utilizes the information gathered by the expendable probe to enable the measurement of temperature as a function of depth. Various problems arise because of the fact that the missile deploys a great length of wire during its descent. Thus, if the ship is moving at a high rate of speed it is desirable that the vertical descent of the probe be as rapid as possible to minimize the length of wire deployed for the sake of accuracy as well as for economic reasons. For example, if copper wire is selected, the effect of the temperature coefficient of resistivity is significant over the range of temperatures encountered by the probe during its descent. Thus, the errors introduced by the varying resistance of the copper wire as the temperature of the water changes, might normally appear as changes in the thermistor resistance, which would introduce errors into the measuring circuits. FIGURES 5, 5a, 6 and 7, illustrate an embodiment of the invention in which this serious drawback is avoided.

In embodiment of FIG. 5, the probe consists of a rear, cone-shaped member 50 including three stabilizing fins 52 and a forward bullet shaped lead weight 54. The rate of descent of the probe is controlled by its manufactured weight and close dimensional control. The weight of the probe may be accurately and automatically adjusted by controlling the amount of conductor wire wound onto the spool within the probe during its manufacture. The probe's weight may also be adjusted if necessary by removing a portion of the lead or other weighted material 54 from its nose. Small manufacturing errors cause asymmetrical pressure gradients which in turn might result in a path of descent which is not vertical. Compensation for this error is achieved by offsetting the end portions 53 of fins 52 to cause the probe to rotate about its vertical axis. The offset provides the probe with vertical stabilization and assists in unreeling the wire. Lead weight 54 includes a central bore in which an elongated tubular sea return electrode is disposed. The thermistor 58 is physically located at the forward end of electrode 55. An important feature of this embodiment is the use of two wires 60 and 62 electrically connected to opposite ends of thermistor 58 and physically supported in a suitable manner on an insulation pad 64 mounted in a planar member 66. The wires 60 and 62 are coiled around the end of tubular electrode 55 which extends rearwardly from lead weight 54. Unlike the embodiment of FIGURE 2, the spool contains no rear retaining plate, and instead, the two wires are coiled in a conical form to facilitate deployment of the line during descent of the probe. One of the two wires, for example wire 60 is electrically connected to the sea return electrode 55 for reasons which will become apparent hereinbelow.

Another embodiment of the probe as shown in FIG. 5a, has been constructed to permit the liquid to flow throughout the whole length of the probe, and exit in the rear, as the probe descends through the fluid medium. The probe consists of the lead weight 54 in its nose and includes a central bore 303 in which an elongated support member 305 is disposed. Member 305 contains on its end a receptacle 301 located near opening 308 of central bore 303 and contains thermistor 307 secured within. Electrical conductors 304 couple the thermistor 307 to the conical winding of wire 310 which is wrapped around spool 302 secured to the after end of lead weight 54. Spool 302 includes a circular flange 311 mounted against lead weight 54 and provides mechanical support for elongated member 305 which protrudes into central bore 303 of weight 54. The center tube of spool 302 upon which wires 310 are wrapped around is of hollow construction and is opened at its end 306. The central hollow of spool 302 is also open and continuous with central bore 303. Accordingly when the probe is released and begins its path of descent through the liquid medium, the liquid will enter into opening 308 and proceed through the entire length of the central bore 303 and spool 302 and exit out of opening 306 adjacent to where conductor 24 is being unreeled from the spool. By permitting the liquid to pass through the entire length of the probe, it is possible to use the liquid to wash the thermistor 307 continuously as the probe descends, and to lubricate the conductor 24 from spool 302 as it unreels and leaves opening 312 at the tail of the probe. The liquid is thus utilized to eliminate much of the friction of conductor 24 passing through the end of the probe. Moreover the flow of the fluid against conductor 24 assists in unreeling the wire from spool 302 and helps to guide the conductor as it leaves the hole in the tail of the probe.

The spool 302 is made from one piece comprising, flange 311, elongated member 305, and the hollow central portion to which conductors 310 are conically wound upon. The elongated member 305 also contains a small channel running along its length to house conductors 304 which interconnect the thermistor 307 to the windings 310. One of the conductors 304, as described with respect to the embodiment of FIG. 5, is also connected to the lead weight 54 so as to provide electrical contact with the sea to which the probe descends.

One of the fins 52 includes an aperture 68. The probe may be stored in a container 70 which includes an aperture 74 so that lanyard pin 72 may be inserted through apertures 74 and 68 to secure the probe until deployment. The probe is positioned immediately in front of a stationary wire coil 76 wound around a spool 78, which includes a rearwardly extending radial flange 79 to engage the end of container 70. A plurality of connector pins 80 are used to couple the entire assembly to the shipboard electronic measuring equipment. The forward extremity of container 70 is closed by means of a cap 82 and includes a rubber bumper 84 to protect the probe prior to its use.

According to the invention, a two wire system is used to compensate for resistance changes in the wire due to temperature differentials. For practical purposes, it may be assumed that the probe will encounter temperatures ranging from thirty to minus two degrees centigrade. Because of this wide temperature excursion, the significant change in resistance of the deployed wire would normally be confused with the thermistor changes of resistance, producing considerable errors. Also of importance is the fact that the gain characteristics of the system will vary due to the variation in the thermistor rate of change of resistance with respect to temperature. This rate may vary by as much as a factor of five over the temperature range encountered.

A basic measuring circuit used to linearize the measured output with respect to temperature by compensating for the above effects is illustrated in FIG. 7. The circuit is basically a constant current Wheatstone bridge and includes a source of voltage 110 which is connected to a relatively high resistance 112 in series with the sea return path between electrodes 55 and 90, electrode 90 being connected to one junction of the bridge. Resistor 112 should have a relatively high resistance to minimize the relatively slight changes in resistance of the sea return path at different temperatures, and to minimize the EMF effects of sea water so that sea water can be used as the power leg to run the two halves of the bridge and eliminate a third power wire.

One leg of the bridge comprises the thermistor 58 and copper wire 62 the impedances of which are illustrated at R56 and R62 respectively. The leg which balances that leg includes copper wire 60, shown as R60, which compensates for the changes in resistance of wire 62 since both wires are subjected to the identical temperatures and thus the same resistance changes. Moreover, both wires may be bonded together within the same envelope to further assure that they both see the same water temperature over their entire length. As noted, the junction of thermistor R56 and wire 60 is coupled to the sea electrode 55 of the probe which is in series with the sea return path and battery 110

The rest of the bridge measuring circuit is located aboard the ship. The bridge includes variable resistors 114 and 116 having slidable taps 114a and 116a, respectively. A fixed resistance 118 is connected in series with wire 60 and one end of resistance 114. A second fixed resistance 120 is coupled between the ends of wire 62 and variable resistor 116. The output of the bridge is taken from the junction of resistors 120 and 62 and slidable tap 114a, and fed to error amplifier 122, which, in a known manner, may be coupled to a servo mechanism or recorder (not shown) to record a visible trace of the temperature on the moving chart with respect to the depth of the probe. The recording mechanism may be turned on when the probe hits the water and completes the sea return current path back to the bridge circuit.

The value of resistor 118 is equal to the minimum thermistor resistance, which is the thermistor resistance at thirty degrees centigrade. The value of resistor 114 is equal to the maximum thermistor resistor (i.e. the thermistor resistance at minus two degrees centigrade) less the minimum thermistor resistance. Resistors 116 and 120 are both equal to one-half the value of resistor 114. Slidable taps 114a and 116a are mechanically linked together and have the same shaped curve of the resistance versus position. The two taps may be driven in a conventional manner by the servo which controls the recording apparatus so that they are positioned in accordance with the resistance value of thermistor 58.

At any condition of bridge balance, the resistance between tap 114a and the junction of resistors 114 and 118 is equal to the measured thermistor resistance minus the minimum thermistor resistance, while the resistance between tap 116a and the junction of resistors 116 and 114 will be equal to one-half the difference between the measured thermistor resistance and the minimum thermistor resistance. It can be therefore shown that the resistance of the bridge arm between taps 114a and 116a is equal to the resistance of the arm between tap 116a and the junction of resistor 120 and wire 62. Similarly, the resistance of the arm including the wire 62 and thermistor 58 is equal to the resistance of the bridge arm between the junction of thermistor 58 and wire 60 and tap 114a. Hence, it can be shown that for a bridge unbalance due to a change in thermistor resistance, the output of the bridge per degree centigrade varies by a much lower factor (i.e. a factor of "two") over the contemplated temperature range despite the five to one variation in the change of thermistor resistance with respect to temperature over this range. Additionally, variation in the source impedance of the bridge may provide additional gain compensation since it increases with the increase in the thermistor rate of resistance change.

FIG. 8 illustrates a catapult launching system for the invention which is particularly useful for launching the probe from the aft portion of the ship. The catapult comprises a triangular base 200 from which three upwardly extending struts 204, 206 and 208 extend. At the upper intersection of struts 204 and 206 a U-shaped yoke 210 is secured. A catapult arm 212 is rotatably supported in yoke 210 by means of a pin 213 suitably journalled in the upstanding legs of the yoke. A cylindrical container 214, adapted to hold the probe, is mounted at the other end of arm 212. Arm 212 is secured in a U-shaped bracket 216 at the top of strut 208 by means of a pin 218 passing through suitable apertures in the bracket and arm.

A conventional elastic arm 220 under tension is secured between the free end of arm 212 and the lower portion of vertical strut 208, so that when pin 218 is removed from bracket 216, arm 212 is free to rotate rapidly in a clockwise direction to thus launch the probe into the water at a position free of the propeller and back wash of the ship.

As shown in FIGS. 9 and 9a, the trajectory 226 of the probe when catapulted is sufficient to reach the bow wave 222 insuring that the probe will not descend into the prop wash area 224.

A boom launching ssytem for deploying the probe into the water is indicated in FIG. 10. The system consists of a vertical mast 228 and a boom 230 extending transversely therefrom. Boom 230 is mounted in a carriage 232 which is movable in a vertical direction on mast 228 by means of a guide 233 and pulley 234.

A second carriage 235 is disposed on the boom, and carries the canister 70. Carriage 235 may be positioned along the boom by means of wire 236 secured at opposite ends to carriage 235 and rotatably mounted around pulleys 240 and 241. Thus, rotation of pulley 241 by means of a crank 238 moves the carriage to the left or right along the boom as desired. A control string 242 is coupled to a lanyard pin 72 extending through the canister 70 and probe, which, when manually pulled, will cause the probe to be deployed into the ocean. Guide line 244 is used to support the free end of the boom. The boom launching system of FIG. 10 may be used when circumstances dictate deployment of the probe from a side of the ship, in which case the probe is deployed into the water in the manner diagrammatically illustrated in FIG. 11 which is self explanatory.

A third launching system is shown in FIG. 12. The launching system in this case comprises a tube 244 into which the canister 70 is placed. Tube 244 is rotatably mounted on upstanding post 246 by means of a pivot member 248 in a conventional manner. When the pin 72 is removed from the canister from the point external of the tube 244, the probe is deployed into the bow wave in order to prevent the wire from entering the prop wash area as shown in FIG. 13. This launching system may also be utilized to deploy the probe from any other part of the ship.

Although various preferred embodiments have been shown and described, many modifications thereof will be obvious to those skilled in the art and the invention should not be limited except as defined in the following claims.

What is claimed is:

1. A canister, for use with a system for measuring a property of a fluid at varying depths and transmitting such information to a remote location, said system including a housing for launching a probe from a moving vehicle, comprising, an elongated hollow container portion having a forward open end and a rearward end, a stationary conductor coil in wound configuration within said container portion adjacent said rearward end, said conductor coil including a continuous wire coiled for being freely payed out from said conductor coil at a rate substantially proportional to the velocity of said probe through the fluid, said probe containing a second conductor coil in wound configuration, said second conductor coil including a continuous wire electrically connected to said stationary conductor coil and coiled for being freely payed out from said second conductor coil at a rate substantially proportional to the velocity of said vehicle with respect to the fluid, said probe which contains said second conductor coil being initially disposed within said hollow container portion prior to the launching of the probe from said moving vehicle, electrical contact means secured to said rearward end for cooperatively engaging vehicle mounted electrical connector means when in an inserted condition, said inserted condition including said hollow container portion being disposed within said housing such that said rearward end of the container portion is adjacent and in contact with said vehicle mounted electrical connector means, said probe having a sensing element for sensing said property of the fluid, said vehicle mounted electrical connector means being electrically connected to the sensing element when the container portion is in said inserted condition, and means for releasing said probe from said container portion.

2. A canister, according to claim 1, further comprising a protective cap for covering said open end.

3. A canister, according to claim 1, wherein said elongated hollow container portion is cylindrical.

4. A canister, according to claim 1, wherein said stationary and said second conductor coils each have a conical portion.

5. A canister, according to claim 1, wherein said electrical contact means include a plurality of pins.

References Cited
UNITED STATES PATENTS

| | | | |
|---|---|---|---|
| 924,091 | 6/1909 | Moss | 242—146 |
| 2,388,749 | 11/1945 | Pierre | 89—1.34 |
| 2,965,029 | 12/1960 | Jackson | 102—87 X |
| 3,220,600 | 11/1965 | Wojciechowski et al. | 220—60 |
| 3,221,556 | 12/1965 | Campbell et al. | 73—362 |
| 3,273,111 | 9/1966 | Parenti | 73—170 |

JAMES J. GILL, *Acting Primary Examiner.*

ROBERT EVANS, RICHARD C. QUEISSER,
*Examiners.*

J. W. MYRACLE, J. J. SMITH, *Assistant Examiners.*